Dec. 29, 1931.  H. L. WILLIAMS  1,838,975
LOADING EQUIPMENT
Filed Nov. 12, 1930

Inventor
Hubert L. Williams

By Blackmore, Spencer & Fish
Attorneys

Patented Dec. 29, 1931

1,838,975

UNITED STATES PATENT OFFICE

HUBERT L. WILLIAMS, OF DETROIT, MICHIGAN, ASSIGNOR TO GENERAL MOTORS CORPORATION, OF DETROIT, MICHIGAN, A CORPORATION OF DELAWARE

LOADING EQUIPMENT

Application filed November 12, 1930. Serial No. 495,096.

This invention relates to the shipment of freight and its particular purpose is to afford an improved arrangement for loading motor vehicles for transportation in freight cars or other carriers.

Various practices have been followed by automobile manufacturers in the shipment of their product from the place of assembly to the purchaser. Considerable difficulty is encountered when vehicles are forwarded in railroad freight cars because of the terrific jolting to which freight cars are subjected when the train starts or stops suddenly and when the individual cars are being shifted back and forth in railroad yards. This jolting in itself, or together with the induced bodily movement by the automobile on its springs and tires, throws strains on the mooring attachments and often causes breakage or damage to the vehicle parts engaged by the attachment connections and sometimes the complete tearing away of the vehicle from its moorings after which further jolting results in a bumping and jamming of one automobile against another and against the walls of the freight car with consequent injurious effect.

Experience has shown that it is almost impossible, because of the very nature of an automobile, if not prohibitively expensive, to securely fasten a motor car absolutely rigid to insure immovability in every case. Rigid connections at a few points only serve to concentrate strains at those points and increase the likelihood of breakage. With these things in mind, there has been developed the present scheme of loading which has been found to function admirably well and to be very effective in holding an automobile in a given location throughout its shipment without damage to any of its parts and which furthermore has the features of low cost, simplicity and accessibility.

The invention will be better understood upon reference to the accompanying drawings illustrating a preferred embodiment and wherein Fig. 1 is a side elevation of an automobile blocked for shipment.

Figure 1:
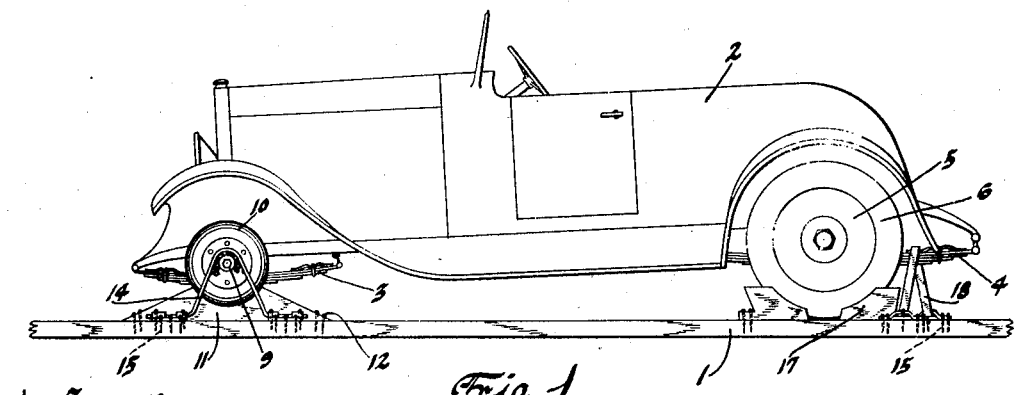
Figure 2:
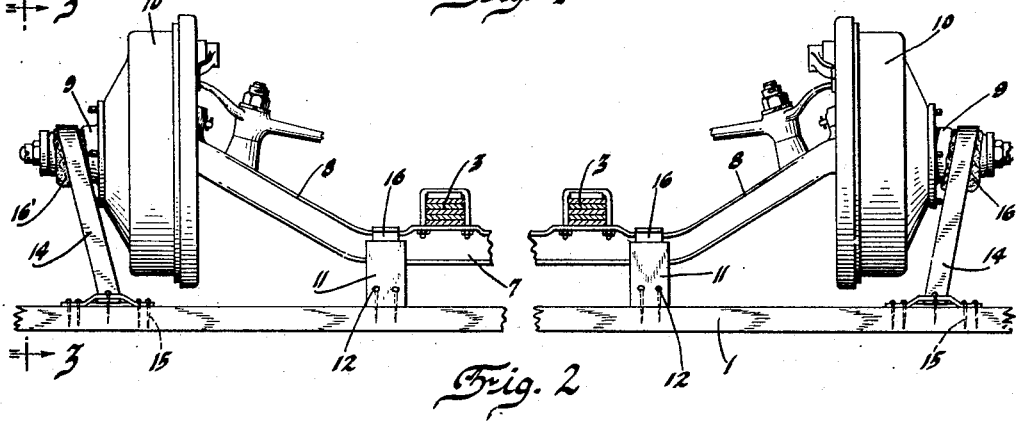
Fig. 2 is an end elevation on a larger scale of the front axle mooring.
Figure 3:
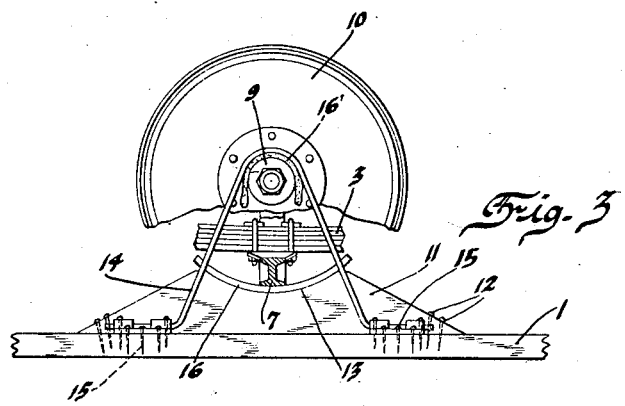
Fig. 3 is an elevation looking in the direction of the arrows on line 3—3 of Fig. 2.

Referring to the drawings, the reference numeral 1 indicates a platform or floor of a box car or other carrier on which is to be located the automobile 2. The automobile is shown as being provided with the customary front and rear longitudinally extending half elliptic springs 3 and 4 respectively, for yieldingly suspending the load on the front and rear axles. The rear axle has at each end thereof a wheel 5 carrying a pneumatic tire 6. The front axle is shown in the present instance as comprising an I-beam having a centrally dropped portion 7 to which the spring 3—3 are secured, with upwardly inclined end portions 8—8, each having swivelled at its outer end the usual steering knuckle, on the spindle of which is rotatably secured the wheel hub 9 to carry a demountable wheel (not shown) and a brake drum 10.

A pair of spaced blocks 11 of substantially triangle shape and preferably of wood, which can be secured to the floor 1 as by nails 12, receive and support the central portion 7 of the axle adjacent the connection with the vehicle springs 3, the axle resting within the relatively wide circular depression or groove 13 at the apex of the block. Within the depression there may be located a lining 16 such as an iron strap or the like, to afford a durable weight supporting surface. The axle is held down by suitable tie connections which may consists of substantially U-shaped metal straps 14, one at each end of the axle, the bight of the strap passing over the hub 9 on the knuckle spindle and its end portions being outturned and secured to the flooring as by means of nails 15. Strips or pieces 16' of felt or other similar material are preferably interposed between the hub and strap 14. If the blocks are made considerably higher than those shown in the drawings there would be no necessity for removing the front wheels but for reasons which will appear hereinafter it is deemed better to remove the front wheels.

The rear axle is shown as supported through the wheels which are simply chocked or held in position by the blocks 17, the rear end of the car being held down by means of the strap 18 which may be similar to the before mentioned strap 14 and which preferably passes over the rear spring and has its ends nailed to the floor. With this arrangement the front of the vehicle sits closer to the floor than does the rear end and this inclination among other things serves to increase available clearance in the freight car.

From the above description it will be seen that the load at the front of the vehicle will be transferred directly to the floor from the axle through the supporting blocks, which are located closely adjacent the spring connections where the load is imposed upon the axle through the springs. For this reason the axle and associated parts are not subjected to any appreciable strains. The hold downs 14, located at the extreme ends of the axle, serve to locate the car in proper position but are sufficiently flexible to accommodate or permit a slight amount of sliding of the axle on the surface of the depression 13 upon jolting, such movement being cushioned to a certain extent by the pneumatic tire 6. By supporting the load at one point and using the hold downs at another point on the axle a braking action on the movement of the car is obtained at both places. It will be seen that the front axle is not loaded rigidly and this arrangement, besides freeing the axle from any twisting strains, reduces the tendency to shear off the axle block, and furthermore the distribution of the braking action reduces the tendency toward bending of the usual tie rod connecting the steering knuckle.

I claim:

1. Loading equipment, including means to receive and support the entire weight of the axle intermediate the wheels and a hold down device at each wheel hub spindle.

2. Car loading equipment, including supporting means for the axle inside the wheel through which the whole load is carried and hold down means at the end of the axle outside the wheel.

3. Car loading equipment, including means to support the axle adjacent its connection with the vehicle springs and hold down means adjacent opposite ends of the axle.

4. Car loading equipment, including supporting means for engagement with the axle in spaced relation with the ends thereof to carry the entire load, and hold down devices engageable with the steering knuckles at the ends of the axle.

5. Car loading equipment, including a support for a central portion of the axle which permits slight relative movement and a flexible hold down for the steering knuckle.

6. Car loading equipment, including means to support the car axle at a point remote from its ends and through which the whole load is carried, and tie down means engageable with the axle adjacent an end thereof in spaced relation with the supporting means.

7. Equipment to load a vehicle on a platform, including a pair of blocks to receive and support a vehicle axle at points spaced from its ends and to be secured to the platform, and a pair of substantially U-shaped straps to be engaged at their bights with the upper sides of steering knuckles on the ends of the axle and to be secured at their ends to the platform.

8. The combination with a loading platform and a vehicle to be loaded, of means on the platform to receive and support an axle of the vehicle intermediate the ends thereof and a tensioned tie connection between the platform and the end of the axle.

9. The combination with a loading platform and a vehicle to be loaded, of means on the platform to receive and support an axle of the vehicle at a point spaced inwardly from the end thereof, and other means on the platform engageable in non-supporting relation with the end of the axle to locate the same.

10. Vehicle loading means, including in combination with a vehicle and a carrier therefor, of supporting means on the carrier engaging the vehicle axle in spaced relation to the ends of the axle, and locating means associated with the carrier and engageable in non-supporting relation with the axle adjacent its end.

11. The method of loading a vehicle for transportation in a carrier, including supporting the weight of the vehicle by its axle at points spaced inwardly from the ends of the axle and then tying down the ends of the axle.

12. The method of shipping vehicles which includes tying down the ends of a vehicle axle and supporting the weight of the vehicle at points spaced inwardly from the axle ends.

13. The method of shipping vehicles which includes tying down the ends of a vehicle axle and supporting the weight of the vehicle at points adjacent the connections between the axle and vehicle springs.

14. The method of shipping vehicles which includes removing the front wheels, chocking the rear wheels, supporting the front axle at points remote from its ends and tying down the front wheel spindles.

15. Equipment to load on a carrier a vehicle having its front wheels removed including chocks engageable with the rear wheels, blocks supporting the front axle remote from its ends and tie connections for the ends of the front axle.

16. Means to load a vehicle through an axle of the dropped center type, including bracing means engageable with a rotatable part on the end of the axle and supporting means for the dropped center portion of the axle having an arcuate bearing surface whose arc is struck from a center located substantially on the axis of said rotatable part.

17. Means to load a vehicle through an axle of the type having an end portion out of alinement with an intermediate portion, including a supporting block receiving the intermediate portion of the axle and having a bearing surface of arcuate formation with the center of the arc substantially in line with the end portion of the axle and a bracing element engageable with said end portion.

In testimony whereof I affix my signature.

HUBERT L. WILLIAMS.